United States Patent [19]

Hopper

[11] 3,915,907

[45] Oct. 28, 1975

[54] CHLOROTHIO-SULFONAMIDE-MODIFIED RUBBERY TERPOLYMERS AND THEIR BLENDS

[75] Inventor: Roger J. Hopper, Akron, Ohio

[73] Assignee: The Goodyear Tire & Rubber Company, Akron, Ohio

[22] Filed: Dec. 16, 1974

[21] Appl. No.: 532,979

[52] U.S. Cl. ............... 260/5; 152/353; 260/33.6 A; 260/33.8 UA; 260/79.5 B; 260/79.5 C; 260/79.5 NV; 260/556 A; 260/556 AR; 260/889

[51] Int. Cl.$^2$ .................. B60C 13/00; C08F 28/02; C08K 5/01; C08L 7/00

[58] Field of Search .. 260/79.5 NV, 79.5 C, 79.5 B, 260/556 A, 556 AR, 5, 33.6 A, 33.8 UA, 889

[56] References Cited
UNITED STATES PATENTS

| | | | |
|---|---|---|---|
| 2,852,497 | 9/1958 | Thompson | 260/79.5 R |
| 3,492,370 | 1/1970 | Wirth | 260/79.5 B |
| 3,649,573 | 3/1972 | Yasui et al. | 260/79.5 B |
| 3,703,500 | 11/1972 | Nast et al. | 260/79.5 B |
| 3,856,762 | 12/1974 | Hopper et al. | 260/79.5 B |
| 3,870,768 | 3/1975 | Blackwood et al. | 260/79.5 C |

FOREIGN PATENTS OR APPLICATIONS

| | | |
|---|---|---|
| 1,101,407 | 3/1961 | Germany |
| 1,156,403 | 10/1963 | Germany |

OTHER PUBLICATIONS

Daniher et al., – Chem. Abs., 70 47008u, (1969).

*Primary Examiner*—Melvyn I. Marquis
*Assistant Examiner*—H. H. Fletcher
*Attorney, Agent, or Firm*—F. W. Brunner; H. C. Young, Jr.

[57] ABSTRACT

Chlorothio-sulfonamide-modified rubbery terpolymers having a low degree of unsaturation, mixtures of such modified terpolymers with highly unsaturated rubbery polymers and vulcanizates of such mixtures. The vulcanizates are particularly useful in the structure of pneumatic tire sidewalls.

12 Claims, No Drawings

CHLOROTHIO-SULFONAMIDE-MODIFIED RUBBERY TERPOLYMERS AND THEIR BLENDS

This invention relates to modified rubbery polymers having a low degree of unsaturation, a process for preparing such modified polymers, mixtures of such modified polymers with highly unsaturated rubbery polymers, and to the vulcanizates of such mixtures.

Mixtures or blends of low-unsaturation rubbery polymers with highly unsaturated rubbery polymers are of practical importance because of the superior ozone resistance imparted to the blend by the low-unsaturation rubber. Unfortunately, the presence of the low-unsaturation rubber also affects the mechanical and hysteresis characteristics of the vulcanizates in an adverse manner, as manifested by lower tensile strength and modulus values, and by higher dynamic heat build-up and permanent set. These undesirable phenomena are generally the result of the mutual insolubilities of the two types of rubber, the substantially slower cure rate of the low-unsaturation rubber, and the greater affinity of the typically polar curatives for the high-unsaturation rubber. As a net result, the vulcanized blend is a heterogeneous dispersion of largely uncured low-unsaturation rubber in well cured high-unsaturation rubber. The degraded mechanical and hysteresis properties caused by this unbalanced cure severely limit, or preclude, the use of such blends in articles subjected to severe service requirements such as tires. A process for improving the physical and dynamic properties of such rubbery polymer vulcanized blends is of considerable commercial practical importance.

It is, therefore, an object of this invention to provide a modified rubbery polymer having a low degree of unsaturation, a process for its preparation and composites or blends of such modified rubbery polymer with high-unsaturation rubbery polymers.

In accordance with this invention, a modified rubbery terpolymer is provided which comprises an admixture of a rubbery terpolymer of ethylene, α-olefin containing 3 to 6 carbon atoms and a non-conjugated diene containing 6 to 12 carbon atoms with an N-chlorothio-sulfonamide of the formula

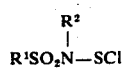

where the mole ratio of said N-chlorothio-sulfonamide to unsaturated sites in said terpolymer is in the range of about 0.06/1 to about 1/1, where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

where $R^3$ and $R^4$ are individually selected from said alkyl, aralkyl, and haloaryl radicals and where $R^3$ and $R^4$ can be joined together to represent radicals selected from $-CH_2-{}_n$, where $n$ is an integer of 4 to 7, and $(CH_2)_2-O-(CH_2)_2$.

In the practice of this invention, for the N-chlorothio-sulfonamide, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical.

Representative of radicals suitable for $R^1$ are radicals selected from methyl, tert butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methy, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl) phenyl radicals.

Representative examples of N-chlorothio-sulfonamides which can be used in the present invention are N-chlorothio-N-methyl-methanesulfonamide,
N-chlorothio-N-methyl-benzenesulfonamide,
N-chlorothio-N-methyl-p-toluenesulfonamide,
N-chlorothio-N-ethyl-p-toluenesulfonamide,
N-chlorothio-N-methyl-ethanesulfonamide,
N-chlorothio-N-phenyl-p-toluenesulfonamide,
N-chlorothio-N-(2-propyl)-methanesulfonamide,
N-chlorothio-N-(1-propyl)-p-chlorobenzenesulfonamide,
N-chlorothio-N-phenyl-methanesulfonamide,
N-chlorothio-N,N',N'-trimethylsulfamide,
N-chlorothio-N-methyl-N',N'-(pentamethylene)sulfamide,
N-chlorothio-N-methyl-N',N'-diethylsulfamide and
N-chlorothio-N-phenyl-benzenesulfonamide.

Chlorothiosulfonamides suitable for use in the admixture of the present invention, as well as their preparation, have further been described in the patent literature. For example, West German DPS 1,156,403 shows the preparation of chlorothio-sulfonamides by reaction of a sulfonamide with $SCl_2$ in the presence of an organic acid acceptor.

West German DPS 1,101,407 shows the preparation of chlorothiosulfonamides from N,N'-dithiobis(sulfonamides) and chlorine or sulfuryl chloride. The chlorothiosulfonamides of the present invention can be prepared by analogous procedures.

In further accordance with this invention, it has been discovered that a new and useful composite comprises 100 parts by weight of the modified rubbery terpolymer of this invention in admixture with about 18 to about 670 parts by weight of a rubber polymer selected from at least one of cis-1,4-polyisoprene natural rubber, synthetic cis-1,4-polyisoprene, polybutadiene, butadiene-styrene copolymer with a butadiene/styrene mole ratio in the range of about 60/40 to about 95/5, butadiene-acrylonitrile copolymer, polypentenamer of the type derived from ring opening polymerization of cyclopentene, bromobutyl, chlorobutyl and polychloroprene. Improved blends include those wherein the low unsaturation rubber/chlorothio-sulfonamide composition comprises about 15 to about 80 weight percent of the rubber blend, the remainder being high-unsaturation rubber.

Futhermore, it has been discovered that an improved rubber comprises the accelerated sulfur cured mixture of the said composite. The invention can therefore particularly relate to a pneumatic tire casing of toroidal shape, outer tread portion and spaced beads having a sidewall connecting said tread portion and bead comprised of said sulfur-cured composite. Such sidewall can demonstrate an improved adhesion to the tire carcass or casing.

It is to be understood that an accelerated sulfur cure can be achieved with elemental sulfur or an organic sulfur donor such as an amine disulfide or a polymeric polysulfide and an organic vulcanization accelerator. Suitable accelerators include mercaptothiazoles, thiazole sulfonamides, thiuram sulfides, thiocarbamylsulfonamides, thioureas, xanthates, and guanidine derivatives. It is to be understood that the blends of this invention may also contain any of the well known conventional additives, such as zinc oxide, stearic acid, fillers, carbon blacks, titanium dioxide, extending oils, plasticizers and stabilizers.

In the practice of this invention, rubbery terpolymers with low unsaturation applicable to the inventive process are terpolymers of ethylene, an α-olefin and at least one non-conjugated diene, wherein only one double bond of the diene enters into the polymerization process, and wherein the diene is incorporated to the extent of about 0.1 to about 1.0 moles per kilogram of polymer. Various α-olefins containing 3 to 6 carbon atoms can be used representative of which are propylene, 1-butene, 1-pentene, and 1-hexene. Propylene is preferred. Such types of rubbery terpolymers are well known and can conveniently be prepared by addition polymerization of the monomers in the presence of a coordination or Zeigler-type catalyst complex.

Preferably, the low unsaturation rubbery terpolymer is an ethylene-propylene diene terpolymer (EPDM), where said terpolymer comprises a mole ratio of ethylene to propylene in the range of about 30/70 to about 70/30 and contains about 0.1 to about 0.8 mole of non-conjugated diene termonomer per kilogram of polymer. Preferred are non-conjugated dienes having 6–12 carbon atoms such as 1,4-hexadiene, dicyclopentadiene, 5-ethylidene-2-norbornene, 5-methylene-2-norbornene, 4,7,8,9-tetrahydroindene, and 1,5-cyclooctadiene.

The mechanisms, chemical and physical, of mixing and reacting, of addition of the N-chlorothiosulfonamide to the low unsaturation rubbery terpolymer and the subsequent blending and curing such modified terpolymer with other rubbers, particularly high unsaturation rubbers, with further attendant potential physical phenomenae are not fully understood. However, it may be desirable to provide some discussion on the subject although it is to be understood that this invention is not intended to be necessarily dependent on any offered theory of chemical or physical mechanism.

The addition of N-chlorothiosulfonamides to the low unsaturation rubbery terpolymer has indeed been technically observed to result in an apparent chemical reaction wherein the chlorothiosulfonamide adds to the double bond of the diene termonomer. For example, with an ethylene-propylene-1,4-hexadiene terpolymer, such adduct may be represented by the formula:

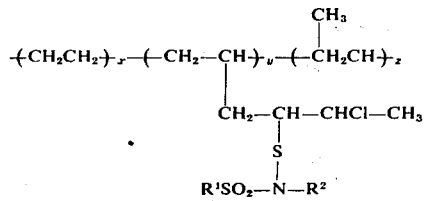

This formula is a simplification, designed for illustrative purposes. It is understood that in an actual terpolymer, the ethylene, propylene and 1,4-hexadiene units are incorporated in a more or less random fashion. Furthermore, the addition product is believed to consist of a second isomer, in which the positions of $R^1SO_2N(R^2)S-$ and $Cl-$ are reversed. Evidence for such an adduct is as follows:

A model adduct was prepared by reaction of N-chlorothio-N-methyl-p-toluenesulfonamide with trans-2-hexene. The model adduct was characterized as a mixture of the isomers $p\text{-}CH_3\text{-}C_6H_5\text{-}SO_2N(CH_3)S\text{-}CH(CH_3)\text{-}CHCl\text{-}CH_2CH_2CH_3$ and $p\text{-}CH_3\text{-}C_6H_5\text{-}SO_2N(CH_3)S\text{-}CH(CH_3CHCl)CH_2CH_2CH_3$ on the basis of its infrared spectrum, proton magnetic resonance spectrum, and elemental analysis. A linear calibration curve was obtained by plotting the infrared absorbance at 620–630cm$^{-1}$ versus concentration for a series of solutions of the model adduct in cyclohexane.

A series of modified ethylene-propylene-1,4-hexadiene polymers were prepared by reaction of solutions the polymer with various concentrations of N-chlorothio-N-methyl-p-toluene sulfonamide and isolated in such a manner (methanol coagulation followed by acetone extraction) that essentially all residues not chemically bound to the polymer were removed. The modified polymers showed new infrared absorbance bands at essentially the same frequencies as the model adduct. By comparison of the intensities of the 620–630cm$^{-1}$ bands for known weights of polymers in cyclohexane with the calibration curve for the model adduct, the apparent extent of polymer bound adduct (in moles/100 g rubber) was calculated. The infrared spectra of thin films of the polymers (no solvent) were used to calculate the ratios (absorbance at 965cm$^{-1}$)/(absorbance at 720–730cm$^{-1}$), and (absorbance at 620–630cm$^{-1}$)/(absorbance at 720–730cm$^{-1}$). The absorbance at 965cm$^{-1}$ is due to the trans double bond in the 1,4-hexadiene termonomer. The absorbance at 720–730cm$^{-1}$ arises from polymethylene units in the polymer backbone chain, is not involved in the modification reaction, and therefore serves as an internal reference. Consequently, the ratios are independent of the film thickness. A plot of (absorbance at 965cm$^{-1}$)/(absorbance at 720–730cm$^{-1}$) versus apparent moles adduct/100 g polymer gave a linear curve with a negative slope. Conversely, a plot of (absorbance at 620–630cm$^{-1}$)/(absorbance at 720–730cm$^{-1}$) versus apparent moles adduct/100 g polymer gave a linear curve with a positive slope. In other words, as the concentration of polymer bound adduct increased, the concentration of olefin bonds decreased in direct proportion. In addition, theoretical elemental compositions for the modified polymers, calculated on the basis of the infrared data, were in agreement with the experimentally determined percentages for carbon, hydrogen, chlorine, nitrogen, and sulfur. It should be pointed out that although extraction of non-polymer bond residues was necessary for the quantitative data described above, such a procedure is not necessary for the practical application of this invention.

Incorporation of the chlorothiosulfonamides into low unsaturation rubbery terpolymers may be achieved by several techniques.

One method involves addition of the chlorothiosulfonamide to a solution of the polymer in an inert organic solvent, such as heptane, hexane, tetrachloroethylene, cyclohexane, methyl cyclohexane, chloroform, benzene or toluene. More polar solvents are preferred since they increase the rate of formation of polymer bound adduct. For example, adduct formation occurs much more rapidly in chloroform as a solvent than in hexane. A mixture of nonpolar solvent with a highly polar solvent may be used advantageously. For example, a mixture of 40 volumes of hexane and 1 volume of acetic acid can product substantially faster adduct formation as compared to hexane alone. Furthermore, the rate of adduct formation can apparently be markedly improved by contact or catalysis with anhydrous zinc chloride.

A second method comprises swelling a solution of the chlorothiosulfonamide into the polymer using the same type of solvents. Preferably, the solvent/polymer ratio is selected so that essentially all the solvent is taken up by the polymer. For this process, it is preferable that the polymer is first prepared in the form of small chunks, or crumbs, and the solvent then added.

A third technique comprises directly milling the chlorothiosulfonamide into the polymer by means of an internal mixer (Banbury or extruder type) or an open roll mill. For direct mixing, it is advantageous to suspend or dissolve the chlorothiosulfonamide in a relatively inert medium such as mineral oil or chlorinated paraffin in order to improve dispersion as well as minimize hydrolysis by atmospheric moisture.

The additions of N-chlorothiosulfonamide in solution, or by swelling may be generally carried out at a temperature in the range of about 10°C to about 125°C but preferably in a range of about 20°C to about 80°C, ambient temperature being the most convenient and practical in the majority of cases. Direct mixing is preferably carried out at the lowest temperature compatible with good polymer processing characteristics, usually about in the 60°C to about 130°C temperature range.

The preferred amount of chlorothiosulfonamide added depends on the specific nature of the low-unsaturated polymer, the specific nature of the highly unsaturated polymer or polymers to be used in a blend of the two types of polymers, the specific cure system and the characteristics desired for the final vulcanizate. The ratio, (moles chlorothiosulfonamide)/(moles unsaturated sites in the polymer) can be from about 0.03/1 to about 1/1, but is preferably in the range of about 0.15/1 to about 0.8/1 and more preferably about 0.2/1 to about 0.7/1. With some EPDM polymers, the use of high ratios can lead to polymer viscosity increases which make processing exceedingly difficult or even practically unmanageable. It is expected that, recognizing this, those having ordinary skill in the polymer compounding art will use a ratio which enhances characteristics of the final vulcanized blend without detrimentally increasing polymer viscosity beyond the point of ease of processability.

The practice of this invention is further illustrated by reference to the following examples which are intended to be representative rather than restrictive of the scope of the invention. Unless otherwise indicated, all parts and percentages are by weight.

It should be noted that Examples I to XVI describe methods for incorporating the chlorothiosulfonamides into the low unsaturation rubbery terpolymers. Examples XVII to XXXII illustrate the use of such modified terpolymers as applied to composites, or blends, with high-unsaturation rubbers and show the improved properties of the vulcanizates. Identification of the low unsaturation rubbery terpolymers of ethylene, propylene and a non-conjugated diene employed in Examples I to XVI is outlined in the following Table 1. The unsaturation of the terpolymer is represented as moles dicyclopentadiene (or moles of carbon to carbon double bonds) per kilogram of rubber or terpolymer.

TABLE 1

| Polymer Identification | Diene | Unsaturation (m/kg rubber) |
|---|---|---|
| (A) | Dicyclopentadiene | 0.4 |
| (B) | Ethylidene norbornene | 0.8 |
| (C) | 1,4-hexadiene | 0.2 |
| (D) | 1,4-hexadiene | 0.4 |

EXAMPLE I

A modified rubbery terpolymer was prepared by cutting 100 grams of terpolymer (A), as identified in Table 1, into ⅛ inch to ¼ inch cubes and tumbling in a closed jar with 256 milliliters (ml) dichloromethane containing 0.0025 moles N-chlorothio-N-methyl-p-toluene sulfonamide. After 4 days at about 25°C, the solvent was decanted, the modified polymer washed with 180 ml of dichloromethane and dried.

EXAMPLE II

A modified terpolymer was prepared according to the method Example I using 0.0050 moles N-chlorothio-N-methyl-p-toluene sulfonamide in 263 ml of dichloromethane.

EXAMPLE III

A modified terpolymer was prepared according to the method of Example I using 0.010 moles N-chlorothio-N-methyl-p-toluene sulfonamide in 275 ml of dichloromethane.

EXAMPLE IV

A modified rubbery terpolymer was prepared by cutting 100 grams of terpolymer (A) into ⅛ inch to ¼ inch cubes, mixing with 250 ml benzene containing 0.0025 moles of N-chlorothio-N-methyl-p-toluene sulfonamide in 6.25 ml dichloromethane, and tumbling in a closed jar for 4 days at about 25°C. The swollen polymer, having absorbed the solvents, was dried at room temperature, or at about 25°C.

EXAMPLE V

A solution of 0.02 moles N-chlorothio-N-methyl-p-toluene sulfonamide in 50 ml dichloromethane was added to a partial solution of 205 grams terpolymer (A) in 3 liters of chloroform and stirred 4 days at about 25°C. The mixture was spread onto a thin sheet and the solvents evaporated to dry the modified terpolymer at room temperature, or at about 25°C.

EXAMPLE VI

A solution of 210 grams terpolymer (A) in 3 liters benzene was mixed with a solution of 0.010 moles N-chlorothio-N-methyl-p-toluene in dichloromethane for 4 days at about 25°C. The resulting solution was coagulated in methanol and the modified terpolymer dried at room temperature, or about 25°C.

EXAMPLE VII

A modified rubber terpolymer was prepared by cutting 100 grams of terpolymer (A) into small chunks of about 1 gram each and tumbling 2 days with a solution of 0.047 moles N-chlorothio-N-methyl-p-toluene sulfonamide in 80 ml dichloromethane and 1 liter of benzene. The swollen chunks were washed with 600 ml of dichloromethane, partially dried under vacuum, then completely dried in a forced air oven at 30°C.

EXAMPLE VIII

A solution of 200 grams of terpolymer (A) in 3 liters of benzene was azeotroped briefly to remove water, and cooled to about 25°C. To this was added, with stirring, a solution of 0.0197 moles N-chlorothio-N',N'-trimethylsulfamide in 35 ml of dichloromethane during a period of ½ hour. After stirring an additional ½ hour, the solution was spread into a thin sheet and the solvents evaporated at about 25°C. The resulting film of modified terpolymer was washed with dichloromethane and dried.

EXAMPLE IX

A solution of 200 grams terpolymer (B), previously identified in Table 1, in 3 liters of benzene was dried by azeotropic distillation and cooled to about 25°C. To this stirred solution was added 0.00174 moles of N-chlorothio-N-cyclohexylmethanesulfonamide in 40 ml of dichloromethane over a period of 1¼ hour. The solution was stirred 1 additional hour, allowed to stand for 16 hours, stirred one hour, then stripped of most solvent under vacuum on a rotary evaporator. The moist modified terpolymer was dried completely at ambient room temperature or about 25°C, and pressure.

EXAMPLE X

A solution of 100 grams of terpolymer (D), previously identified in Table 1, in 1800 ml of benzene was dried by azeotroping and cooled at room temperature or about 25°C. To this was added, with stirring, a solution of 0.02 moles N-chlorothio-N-methyl methanesulfonamide in 25 ml of dichloromethane during 15 minutes. After stirring an additional 40 minutes, the solution was spread into a thin layer and the solvents allowed to evaporate. The thin film of modified terpolymer was then washed with dichloromethane and dried.

EXAMPLE XI

An azeotropically dried solution of 200 grams of terpolymer (D) in 3 liters of benzene was mixed with a solution of 0.048 moles N-chlorothio-N-methyl-p-chlorobenzene sulfonamide in 100 ml dichloromethane and allowed to stand 2 days at about 25°C. The majority of solvent was removed under vacuum on a rotary evaporator, and the modified terpolymer was then allowed to stand in the air until dry.

EXAMPLE XII

To an azeotropically dried solution of 200 grams of terpolymer (C), previously identified in Table 1, in 3 liters of benzene was added a solution of 0.02 moles N-chlorothio-N-phenyl benzenesulfonamide during 1½ hour, with stirring at about 25°C. The solution was then stirred 2 hours at about 40°C to 50°C, allowed to stand 2 days at about 25°C, and stirred 3½ hours at about 40° to 50°C. The solvents were then removed from the modified terpolymer on a rotary evaporator under vacuum.

EXAMPLE XIII

A 50 weight percent mixture of N-chlorothio-N-phenyl benzenesulfonamide in mineral oil was milled directly into terpolymer (A), (identified in Table 1), on a laboratory sized internal mixer (Banbury type). The ratio was 2.0 g of the 50 weight percent mixture per 55 grams of polymer. Mixing was carried out for ten minutes at less than about 125°C to prepare the modified terpolymer.

EXAMPLE XIV

A modified terpolymer was prepared according to the method of Example XIII using a ratio of 2.6 grams of 50 weight percent mixture per 55 grams polymer.

EXAMPLE XV

A modified terpolymer was prepared according to the method of Example XIII using a ratio of 3.2 grams of 50 weight percent mixture per 55 grams polymer.

EXAMPLE XVI

A paste mixture consisting of 60 weight percent N-chlorothio-N-methyl-p-toluenesulfonamide/40 weight percent chlorinated paraffin liquid was milled into terpolymer (D), identified in Table 1, according to the method of Example XIII. A ratio of 9.6 parts by weight of the 60/40 pasty mixture to 60 parts by weight terpolymer was used. The mixing temperature was less than about 107°C for preparing the modified terpolymer.

EXAMPLE XVII

A 7.15 weight percent solution of 117 grams terpolymer (D) in 1520 grams benzene was diluted with 300 ml of benzene and azeotropically dried under nitrogen. To this was added 0.023 mole of N-chlorothio-N-methyl-p-toluenesulfonamide in 25 ml of dichloromethane solution, and 3.2 grams of powdered anhydrous zinc chloride. The mixture was stirred under nitrogen for 4 hours at 30°C. The resulting dark brown mixture was stirred with 2 liters of water, causing the color to disappear. The water layer was separated and the polymer solution washed with an additional liter of water. After separation, 1 liter of methanol was stirred into the polymer solution giving a two phase mixture from which the upper methanol layer was removed. This procedure was repeated with 600 ml of methanol. Next, 1 liter of methanol was added with virorous stirring causing the polymer to form a flocculant precipitate which was filtered, washed thoroughly with acetone, and dried at room temperature. The resulting beige colored modified terpolymer was analyzed by the previously described infrared procedures, showing 0.0144 mole polymer bound adduct per 100 grams of polymer.

EXAMPLE XVIII

The low-unsaturation rubber terpolymers A–D, (EPDM's), before and after admixture or modification with N-chlorothio-sulfonamides were evaluated in a variety of composites with high-unsaturation rubbery polymers and copolymers in order to illustrate a diversity of such composites and their vulcanizates. Test recipe masterbatches of the high-unsaturation rubbery polymers and copolymers shown in the following Table 2, were prepared in a size 00 (1300 gram) Banbury or Brabender Plasticorder equipped with a Banbury-type head (sized for a 50 to 60 gram charge). The remaining ingredients, particularly the modified low-unsaturation rubbery terpolymers, which were then mixed with such individual masterbatches on a conventional open roll mill, are specified in the individual following examples.

TABLE 2

| Masterbatch | Test Masterbatches Components | Parts |
|---|---|---|
| AA | Natural Rubber (cis-1,4-poly-isoprene) | 30.00 |
| | High cis-1,4-polybutadiene rubber | 30.00 |
| | Carbon black (FEF) | 30.00 |
| | Phenolic antioxidant | 2.00 |
| | Rosin Oil | 3.00 |
| | Stearic Acid | 1.00 |
| BB | Synthetic cis-1,4-polyisoprene rubber | 70.00 |
| | EPDM rubber | 30.00 |
| | Carbon black (FEF) | 50.00 |
| | Phenolic antioxidant | 1.00 |
| | Rosin Oil | 3.00 |
| | Stearic Acid | 1.50 |
| CC | Butadiene/Acrylonitrile rubbery copolymer | 60.00 |
| | EPDM rubber | 40.00 |
| | SRF carbon black | 50.00 |
| | Stearic Acid | 0.80 |
| DD | Butadiene/styrene copolymer | 60.00 |
| | EPDM | 40.00 |
| | Carbon black (HAF) | 50.00 |
| | Highly paraffinic oil | 20.00 |
| | Stearic acid | 1.50 |
| EE | Trans-polypentenamer rubber (ring opening polymerized cyclopentene) | 70.00 |
| | EPDM rubber | 30.00 |
| | Oil, naphthenic rubber processing | 45.00 |
| | Stearic acid | 3.00 |
| FF | Polychloroprene | 70.00 |
| | EPDM rubber | 30.00 |
| | Oil, naphthenic rubber processing | 20.00 |
| | Carbon black (HAF) | 50.00 |
| | Stearic acid | 1.00 |
| GG | Synthetic cis-1,4-polyisoproene rubber | 70.00 |
| | Carbon black (FEF) | 50.00 |

Tensile strength and modulus data for the following examples were obtained according to standard rubber test procedures. Dumbbell shaped samples were cut from vulcanized sheets and tested in a conventional tensile tester. Such procedure is described in "New Autographic Machine for Testing Tensile Properties of Rubber," by G J Albertomi, Industrial and Engineering Chemistry, Analytical Edition, Vol 3, p 236, 1931.

Dynamic heat build-up ($\Delta(\Delta$ and permanent set (% set) data were obtained with a Goodrich Flexometer according to ASTM D-623, Method A (0.175 inch or 0.445cm stroke, 143 psi or 10.054 kg/cm$^2$ static load, 100°F or 38°C initial temprature).

Cure characteristics were determined on a Monsanto Oscillating Disk Rheometer, essentially according to ASTM D-2084-71-T (300°F or 149°C, 3° arc, 100 cycles/min). Pertinent data reported are: $t_4$, the time to a 4-torque unit rise above the mininum; $\Delta$ torque, the maximum torque after curing minus the minimum torque; min torque, the minimum torque, $t_{90}$, the time required to reach 90 percent of full torque development. In the subsequent examples, $t_4$ is taken as a measure of scorch delay, $\Delta$ torque is an approximation of relative modulus, min torque as an indication of the "stiffness" of the uncured stock, and $t_{90}$ as the optimum cure time.

In the following examples, the data are presented without comment, since the conclusion is essentially the same in all instances. That is, as a general rule, the vulcanizates derived from the low-unsaturation rubber-N-chlorothio sulfonamide compositions (modified terpolymers), exhibit superior properties as compared to the controls. These superior properties are evidenced by the values for tensile strength, modulus, dynamic heat build-up ($\Delta$ T) and permanent set (% set).

EXAMPLE XIX

Common to all:
96.00 Masterbatch AA, 40.00 low-unsaturation rubber (EPDM), 4.00 Zinc Oxide, 1.50 Sulfur, 0.50 2-mercaptobenzothiazole, 0.31 tetramethylthiuramdisulfide.

| Rheo-meter Data | Polymer A, From Table 1 (Control) | Low-unsaturation Rubber Source PRODUCT FROM EXAMPLE - | | | | |
|---|---|---|---|---|---|---|
| | | II | III | IV | V | VI |
| $t_4$, min | 5.2 | 5.8 | 5.4 | 5.6 | 5.3 | 5.4 |
| $t_{90}$, min | 8.8 | 11.5 | 13.0 | 11.5 | 13.0 | 11.5 |
| min torque | 12.2 | 14.8 | 16.2 | 12.1 | 17.8 | 12.5 |
| $\Delta$ torque | 31.8 | 39.5 | 50.3 | 34.7 | 50.4 | 36.0 |
| Stress/Strain Data (cured $t_{90}$ min at 300°F) | | | | | | |
| tensile, MN/m$^2$ | 8.9 | 9.2 | 10.8 | 9.0 | 11.0 | 8,2 |
| % elongation | 375 | 360 | 360 | 390 | 360 | 360 |
| 300% modulus, MN/m$^2$ | 6.8 | 7.4 | 8.6 | 6.6 | 8.8 | 6.6 |
| Goodrich Flex Data (cured $t_{90}$ min at 300°F) | | | | | | |
| $\Delta$T, after 15 min, °F | 115 | 91 | 65 | 108 | 60 | 105 |
| % set | 11.8 | 5.2 | 2.6 | 8.5 | 2.3 | 7.9 |

MN/m$^2$ = Meganewtons per square meter

EXAMPLE XX

Common to all:
96.00 Masterbatch AA, 40.00 low-unsaturation rubber (control = Polymer A, Table 1; test = product from Example VII), 4.00 Zinc oxide.

EXAMPLE XXIII

Common to all:
155.5 Masterbatch BB (Control — Polymer (D), Table 1; test stock — product from Example XI), 4.00 zinc oxide, 2.00 sulfur, 1.00 2-morpholinodithiobenzothiazole.

| Additional Components (phr) | Control | Test | Control | Test | Control | Test | Control | Test |
|---|---|---|---|---|---|---|---|---|
| sulfur | 0.80 | 0.80 | 2.00 | 2.00 | 2.00 | 2.00 | 2.00 | 2.00 |
| 2-Morpholinodithiobenzothiazole | 1.40 | 1.40 | | | | | | |
| Tetramethylthiuram Disulfide | 0.05 | 0.50 | | | | | | |
| N-cyclohexyl benzothiazole sulfenamide | | | 1.00 | 1.00 | | | | |
| 2,2'-dithiobis(benzothiazole) | | | | | 1.00 | 1.00 | | |
| diphenylguanidine | | | | | 0.75 | 0.75 | | |
| 2-morpholinothiobenzothiazole | | | | | | | 1.00 | 1.00 |
| Rheometer Data: | | | | | | | | |
| $t_4$, minutes | 9.6 | 9.4 | 9.6 | 10.0 | 3.5 | 4.0 | 16.3 | 17.0 |
| $t_{90}$, minutes | 16.5 | 17.8 | 14.5 | 17.6 | 6.9 | 8.6 | 24.0 | 29.8 |
| min torque | 12.5 | 16.2 | 12.9 | 15.9 | 12.5 | 15.2 | 11.1 | 17.2 |
| torque | 31.4 | 50.8 | 32.1 | 51.6 | 35.5 | 55.8 | 32.8 | 52.7 |
| Stress/Strain data: (cured $t_{90}$ min at 300°F) | | | | | | | | |
| tensile, $MN/m^2$ | 9.2 | 12.7 | 9.3 | 13.5 | 8.8 | 11.4 | 8.2 | 10.3 |
| % elongation | 400 | 385 | 435 | 410 | 370 | 315 | 460 | 350 |
| 300% modulus, $MN/m^2$ | 6.4 | 9.0 | 5.7 | 9.1 | 6.8 | 10.8 | 4.4 | 8.3 |
| Goodrich Flex Data: (cured $t_{90}$ min at 300°F) | | | | | | | | |
| $\Delta T$, °F, after 3 minutes | 54 | 32 | 53 | 33 | 53 | 32 | 54 | 30 |
| after 6 minutes | F | — | F | — | F | — | 87 | 46 |
| after 15 minutes | — | 65 | — | 67 | — | 62 | F | 58 |
| % set | — | 3.8 | — | 5.6 | — | 3.8 | — | 3.2 |

F = Failure

EXAMPLE XXI

Common to all:
171.5 Masterbatch DD (Control = Polymer (B), Table 1, Test stock = product from Example IX), 5.00 Zinc oxide, 1.80 sulfur, 1.20 N-tert-butyl benzothiazole sulfenamide.

| | Low Unsaturation Rubber | |
|---|---|---|
| Rheometer Data: | Control | Test |
| $t_4$, minutes | 14.5 | 15.5 |
| $t_{90}$, minutes | 36.0 | 37.5 |
| min torque | 10.6 | 12.2 |
| $\Delta$ torque | 46.4 | 51.8 |
| Stress/Strain Data: (cured $t_{90}$ min at 300°F) | | |
| tensile, $MN/m^2$ | 11.5 | 13.0 |
| % elongation | 290 | 275 |
| 200% modulus | 7.0 | 8.0 |
| Goodrich Flex: (cured $t_{90}$ min at 300°F) | | |
| $\Delta T$, °F, after 15 min | 75 | 63 |
| % set | 2.4 | 1.5 |

EXAMPLE XXII

Common to all:
96.00 Masterbatch AA, 40.00 low-unsaturation rubber (Control = Polymer (D), Table 1; Test stock = product from Example X), 4.00 Zinc oxide, 2.00 sulfur, 1.00 2-morpholinothio-benzothiazole.

| Rheometer Data: | Control | Test |
|---|---|---|
| $t_4$, minutes | 15.8 | 14.4 |
| $t_{90}$, minutes | 24.4 | 27.1 |
| min torque | 14.5 | 13.9 |
| $\Delta$torque | 40.5 | 54.0 |
| Stress/Strain Data: * | Control | Test |
| tensile, $MN/m^2$ | 8.6 | 10.8 |
| % elongation | 430 | 430 |
| 300% modulus, $MN/m^2$ | 5.5 | 6.6 |
| Goodrich Flex Data: * | | |
| $\Delta T$, °F, after 3 min | 37 | 25 |
| after 6 min | 67 | 44 |
| after 15 min | Failed | 57 |
| % set | — | 3.1 |

* (cured $t_{90}$ min at 300°F)

| Rheometer Data: | Control | Test |
|---|---|---|
| $t_4$, minutes | 8.5 | 9.5 |
| $t_{90}$, minutes | 18.5 | 24.5 |
| min torque | 14.2 | 13.5 |
| $\Delta$torque | 50.8 | 69.3 |
| Stress/Strain Data: (cured $t_{90}$ min at 300°F) | | |
| tensile, $MN/m^2$ | 14.5 | 17.6 |
| % elongation | 455 | 380 |
| 300% modulus, $MN/m^2$ | 9.4 | 14.2 |
| Goodrich Flex: (cured $t_{90}$ min at 300°F) | | |
| $\Delta T$, °F, after 15 minutes | 87 | 46 |
| % set | 6.7 | 1.2 |

EXAMPLE XXIV

Common to all:
150.8 Masterbatch CC (Control — Polymer (C), Table 1; test stock — product from Example XII), 5.00 zinc oxide, 1.50 sulfur, 0.40 tetramethylthiuram disulfide.

| Rheometer Data: | Control | Test |
|---|---|---|
| $t_4$, minutes | 5.7 | 7.6 |
| $t_{90}$, minutes | 15.5 | 20.5 |
| min torque | 17.5 | 19.5 |
| $\Delta$ torque | 47.5 | 69.5 |
| Stress/Strain data: (cured $t_{90}$ min at 300°F) | | |
| tensile, $MN/m^2$ | 6.6 | 13.0 |
| % elongation | 230 | 290 |
| 200% modulus, $MN/m^2$ | 5.9 | 8.9 |
| Goodrich Flex Data: (cured $t_{90}$ min at 300°F) | | |
| $\Delta T$, °F, after 3 minutes | F | 53 |
| after 15 minutes | — | 77 |
| % set | — | 1.9 |

EXAMPLE XXV

Common to all:
223.0 Masterbatch EE (Control — Polymer (D), Table 1; test stock — polymer from Example XI), 3.00 zinc oxide, 2.00 sulfur, 0.50 N-cyclohexyl-2-benzothiazole sulfenamide, 0.80 tetramethylthiuram disulfide.

| Rheometer Data: | Control | Test |
|---|---|---|
| $t_4$, minutes | 3.5 | 3.5 |
| $t_{90}$, minutes | 8.0 | 18.6 |
| min torque | 16.2 | 17.2 |
| Δ torque | 45.3 | 71.3 |
| Stress/Strain Data: (cured $t_{90}$ min at 300°F) | | |
| tensile, MN/m² | 12.2 | 13.3 |
| % elongation | 320 | 245 |
| 200% modulus | 6.4 | 10.0 |
| Goodrich Flex Data (cured $t_{90}$ min at 300°F) | | |
| Δ T, °F, after 15 minutes | 79 | 56 |
| % set | 6.0 | 1.0 |

EXAMPLE XXVII

Common to all:

96.00 Masterbatch AA, 40.00 Low-unsaturation rubber (EPDM), 4.00 zinc oxide, 2.00 sulfur, 1.20 2-morpholinothio-benzothiazole.

| | Low unsaturation rubber | | | |
|---|---|---|---|---|
| Rheometer Data | Polymer (A) Table 1 (Control) | Product from Example | | |
| | | XIII | XIV | XV |
| $t_4$, minutes | 19.5 | 19.2 | 19.5 | 19.0 |
| $t_{90}$, minutes | 28.5 | 31.2 | 32.4 | 31.8 |
| min torque | 10.7 | 11.2 | 11.8 | 12.0 |
| Δ torque | 35.8 | 41.9 | 43.2 | 43.1 |
| Stress/Strain Data: (cured $t_{90}$ min at 300°F) | | | | |
| tensile, MN/m² | 8.3 | 8.2 | 8.5 | 9.8 |
| % elongation | 390 | 340 | 350 | 350 |
| 300% modulus | 5.8 | 6.8 | 6.9 | 8.1 |
| Goodrich Flex Data: (cured $t_{90}$ min at 300°F) | | | | |
| Δ T, °F, after 15 min | 123 | 88 | 81 | 84 |
| % set | 15.6 | 8.0 | 6.7 | 6.5 |

EXAMPLE XXVI

Common to all:

171.00 Masterbatch FF (Control a — Polymer (A), Table 1; test stock a — polymer from Example VIII; Control b — Polymer (B), Table 1; test stock b — polymer from Example IX), 5.00 zinc oxide, 3.00 magnesium oxide, 1.00 2,2′-dithiobis (benzothiazole), 0.30 tetramethylthiuram monosulfide, 1.00 sulfur, 0.50 ethylenethiourea.

| | Control a | Test a | Control b | Test b |
|---|---|---|---|---|
| Stress/Strain Data, cured 30 min at 320°F | | | | |
| tensile MN/m² | 9.8 | 13.4 | 14.2 | 17.7 |
| % elongation | 240 | 280 | 280 | 310 |
| 200% modulus, MN/m² | 7.8 | 8.6 | 8.8 | 10.1 |
| Goodrich Flex Data, cured 30 min at 320°F: | | | | |
| ΔT, °F, after 3 min | 62 | 58 | 50 | 50 |
| 6 min | failed | 84 | 66 | 65 |
| 15 min | — | 96 | 75 | 73 |
| % set | — | 6.1 | 2.3 | 2.8 |

EXAMPLE XXVIII

Common to all:
96.00 Masterbatch AA, 4.00 Zinc oxide, 2.00 sulfur, 1.00 2-morpholinothiobenzothiazole.

| Additional Components (phr) | Control stock | Test stock |
|---|---|---|
| Polymer (D), Table 1 | 40.00 | — |
| Chlorinated paraffin | 3.0 | — |
| Product from Example XVI | — | 46.0 |
| Rheometer Data: | | |
| $t_4$, min | 15.6 | 17.7 |
| $t_{90}$, min | 24.5 | 42.0 |
| min torque | 13.8 | 14.4 |
| Δ torque | 39.2 | 55.6 |
| Stress/Strain Data: (cured $t_{90}$ min at 300°F) | | |
| tensile, MN/m² | 9.3 | 13.2 |
| % elongation | 410 | 425 |
| 300% modulus | 6.0 | 7.2 |
| Goodrich Flex Data: * | | |
| Δ T, °F, after 12 min | 81 | 34 |
| after 15 min | Failed | 35 |
| % set | — | 1.1 |

EXAMPLE XXIX

Common to all:
120.00 Masterbatch GG, 1.00 phenolic antioxidant, 1.50 stearic acid, 4.00 zinc oxide, 2.00 sulfur.

| Additional Components | Control a | Test a | Control b | Test b |
|---|---|---|---|---|
| Polymer (D), Table 1 | 30 | | 30 | |
| Product from Ex XVII | | 31 | | 31 |
| 2-morpholinodithio-benzothiazole | 1.0 | 1.0 | | |
| tetramethylthiuram disulfide | 0.05 | 0.05 | | |
| 2-morpholinothio-benzothiazole | | | 1.0 | 1.0 |
| Rheometer Data: | | | | |
| $t_4$, minutes | 4.7 | 4.9 | 6.5 | 8.3 |
| $t_{90}$, minutes | 7.8 | 9.3 | 11.6 | 17.8 |
| min torque | 6.8 | 9.8 | 8.0 | 9.3 |
| Δ torque | 60.1 | 75.2 | 57.7 | 68.4 |

—Continued

| Additional Components | Control a | Test a | Control b | Test b |
|---|---|---|---|---|
| Stress/Strain Data: * | | | | |
| tensile, MN/m² | 15.2 | 21.8 | 17.7 | 22.8 |
| % elongation | 350 | 395 | 400 | 450 |
| 300% modulus, MN/m² | 13.2 | 15.8 | 12.9 | 14.3 |
| Goodrich Flex Data: * | | | | |
| Δ T, °F, after 15 min | 65 | 37 | 63 | 38 |
| % set | 3.3 | 1.1 | 4.8 | 1.1 |

* (cured t₉₀ min at 300°F)

While certain representative embodiments and details have been shown for the purpose of illustrating the invention, it will be apparent to those having skill in this art that various changes and modifications may be made therein without departing from the spirit or scope of the invention.

What is claimed is:

1. A modified rubbery terpolymer which comprises the admixture product of a rubbery terpolymer of ethylene, α-olefin containing 3 to 6 carbon atoms and a non-conjugated diene containing 6 to 12 carbon atoms, wherein the diene is incorporated to the extent of about 0.1 to about 1.0 moles per kilogram of polymer, with an N-chlorothio-sulfonamide of the formula

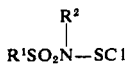

where the mole ratio of said N-chlorothio-sulfonamide to unsaturated sites in said terpolymer is in the range of about 0.06/1 to about 1/1, where $R^1$ and $R^2$ are selected from the group consisting of alkyl radicals having 1–20 carbon atoms, aralkyl radicals having 7–20 carbon atoms, alkaryl radicals having from 7–20 carbon atoms, and haloaryl radicals having 6–10 carbon atoms and where $R^1$ is also selected from radicals having the formula

where $R^3$ and $R^4$ are individually selected from said alkyl, aralkyl, and haloaryl radicals and where $R^3$ and $R^4$ can be joined together to represent radicals selected from $-CH_2-_n$, where n is an integer of 4 to 7, and $-CH_2-_2-O-CH_2-$.

2. The modified rubbery terpolymer of claim 1 where said terpolymer is comprised of a mole ratio of ethylene to propylene in the range of about 30/70 to about 70/30 and contains about 0.1 to about 0.8 mole of nonconjugated diene termonomere per kilogram of polymer, where said diene is selected from 1,4-hexadiene, dicyclopentadiene, 5-ethylidene-2-norbornene, 5-methylene-2-norbornene, 4,7,8,9-tetrahydroindene and 1,5-cyclooctadiene.

3. The modified rubbery terpolymer of claim 2 where, in the N-chlorothiosulfonamide, $R^1$ and $R^2$ are selected from alkyl radicals having 1 to 6 carbon atoms, phenyl radicals, monoalkyl substituted phenyl radicals having from 7 to 10 carbon atoms and dialkyl substituted phenyl radicals having from 8 to 11 carbon atoms where such alkyl substituent or substituents are radicals selected from the group consisting of methyl, ethyl, and all isomeric forms of propyl and butyl radicals, and from the p-chlorophenyl radical.

4. The modified rubbery terpolymer of claim 2 where, in the N-chlorothio-sulfonamide, the $R^1$ radicals are selected from methyl, tert butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals and the $R^2$ radicals are selected from methyl, tert butyl, 1-eicosyl, cyclohexyl, benzyl, 1-(p-n-dodecylphenyl)-1-ethyl, phenyl, 1-naphthyl, m-tolyl, 3,4-di-(n-heptyl)phenyl, p-bromophenyl and 3-chloro-4-(n-butyl)-phenyl radicals.

5. The modified rubbery terpolymer of claim 2 where said N-chlorothio-sulfonamide is selected from
    N-chlorothio-N-methyl-methanesulfonamide,
    N-chlorothio-N-methyl-benzenesulfonamide,
    N-chlorothio-N-methyl-p-toluenesulfonamide,
    N-chlorothio-N-methyl-ethanesulfonamide,
    N-chlorothio-N-phenyl-p-toluenesulfonamide,
    N-chlorothio-N-(1-propyl)-p-chlorobenzenesulfonamide,
    N-chlorothio-N-(2-propyl)-methanesulfonamide,
    N-chlorothio-N-phenyl-methanesulfonamide,
    N-chlorothio-N,N',N'-trimethylsulfamide,
    N-chlorothio-N-methyl-N',N'-(pentamethylene)sulfamide,
    N-chlorothio-N-methyl-N',N'-diethylsulfamide and
    N-chlorothio-N-phenyl-benzenesulfonamide.

6. A method of preparing the modified rubbery terpolymer of claim 1 which comprises mixing said N-chlorothio sulfonamide with a mixture of said terpolymer and an organic solvent selected from heptane, hexane, tetrachloroethylene, cyclohexane, methyl cyclohexane, chloroform, benzene and toluene.

7. A method of preparing the modified rubbery terpolymer of claim 1 which comprises milling a mixture of said N-chlorothio sulfonamide and a dispersant selected from mineral oil and chlorinated paraffin into said rubbery terpolymer.

8. A composite which comprises 100 parts by weight of modified rubbery terpolymer of claim 2 in admixture with about 18 to about 670 parts by weight of a rubbery polymer comprised of at least one of cis-1,4-polyisoprene natural rubber, synthetic cis-1,4-polyisoprene, polybutadiene, butadiene-styrene copolymer with a butadiene/styrene mole ratio in the range of about 60/40 to about 95/5, butadiene-acrylonitrile copolymer, polypentenamer of the type derived from open ring polymerization of cyclopentene, bromobutyl rubber, chlorobutyl rubber and polychloroprene.

9. The sulfur-cured composite of claim 8.

10. The composite of claim 8 which comprises about 15 to about 80 weight percent of said modified rubbery terpolymer where said N-chlorothio-sulfonamide is selected from
- N-chlorothio-N-methyl-methanesulfonamide,
- N-chlorothio-N-methyl-benzenesulfonamide,
- N-chlorothio-N-methyl-p-toluenesulfonamide,
- N-chlorothio N-ethyl-p-toluenesulfonamide,
- N-chlorothio-N-methyl-ethanesulfonamide,
- N-chlorothio-N-phenyl-p-toluenesulfonamide,
- N-chlorothio-N-(2-propyl)-methanesulfonamide,
- N-chlorothio-N-(1-propyl)-p-chlorobenzenesulfonamide,
- N-chlorothio-N-phenyl-methanesulfonamide,
- N-chlorothio-N,N',N'-trimethylsulfamide,
- N-chlorothio-N-methyl-N',N'-(pentamethylene)sulfamide,
- N-chlorothio-N-methyl-N',N'-diethylsulfamide and
- N-chlorothio-N-phenyl-benzenesulfonamide.

11. The sulfur-cured composite of claim 10.

12. The modified rubbery terpolymer of claim 2 where said terpolymer is comprised of ethylene, propylene and a non-conjugated diene selected from 1,4-hexadiene and dicyclopentadiene and where, in said N-chlorothio-sulfonamide, $R^1$ is selected from methyl, phenyl and p-tolyl radicals and $R^2$ is selected from methyl and phenyl radicals.

* * * * *